UNITED STATES PATENT OFFICE.

JOHN F. BEAZEL, OF UNIONTOWN, PENNSYLVANIA.

IMPROVEMENT IN WELDING IRON AND STEEL.

Specification forming part of Letters Patent No. 97,023, dated November 23, 1869.

*To all whom it may concern:*

Be it known that I, JOHN F. BEAZEL, of Uniontown, in the county of Fayette and State of Pennsylvania, have invented a new and useful Improvement in Welding Iron and Steel; and I do hereby declare that the following is a full, clear, and exact description thereof, which will enable others skilled in the art to make and use the same.

This invention relates to improvements in welding iron and steel; and consists in working the same in the presence of a flux of caustic soda, known in commerce as "saponifier" or "concentrated lye." By its use I am enabled to weld plated iron, and I find also that it is equally as useful in brazing as the brazing-solder commonly used.

I use it, in welding, in the following way: I dress the points of iron or steel to be welded in the usual manner. They are then brought to a red heat, and the caustic soda applied to the surfaces of the hot metal to be welded. It melts, runs over the surface, and permeates the metal, preparing it for welding, which is then done after returning it to the fire and raising it to a welding-heat.

Steel may be tempered by putting about a spoonful of the said caustic soda in a gallon and a half of rain-water, and using the bath in the usual way.

Rotten iron, when heated and saturated with this flux, becomes tough and purified under the blacksmith's hammer.

Cast-steel can be welded to iron without any diminution of the metal.

Spring-steel can be perfectly welded, and, also, hoop-iron, without any danger of burning in the process.

Having thus described my invention, I claim as new and desire to secure by Letters Patent—

The employment of caustic soda for welding iron and steel, substantially as specified.

The above specification of my invention signed by me this 21st day of September, 1869.

JOHN F. BEAZEL.

Witnesses:
 HENRY McCLAY,
 MARSHALL N. LEWIS.